United States Patent [19]

Kelley et al.

[11] Patent Number: 5,537,587
[45] Date of Patent: Jul. 16, 1996

[54] FILE RECORD MAINTENANCE IN A DATA PROCESSING SYSTEM BY SYNCHRONIZATION OF MENUS WITH CORRESPONDING DATA FILES

[75] Inventors: Edward E. Kelley, Wappingers Falls; Norman J. Daurer, Hopewell Junction, both of N.Y.

[73] Assignee: International Business Machines Corporation, Armonk, N.Y.

[21] Appl. No.: 241,251

[22] Filed: May 11, 1994

[51] Int. Cl.[6] .................................................. G06F 17/30
[52] U.S. Cl. .................... 395/600; 375/156; 375/157; 375/415; 375/421.11; 364/DIG. 1; 364/282.1; 364/286; 364/286.2
[58] Field of Search .................... 395/600, 157, 395/160, 156, 421.11, 415; 364/DIG. 1

[56] References Cited

U.S. PATENT DOCUMENTS

| | | | |
|---|---|---|---|
| 4,852,019 | 7/1989 | Vinberg et al. | 364/900 |
| 4,887,204 | 12/1989 | Johnson et al. | 364/200 |
| 4,999,766 | 3/1991 | Peters et al. | 364/200 |
| 5,129,082 | 7/1992 | Tirfing et al. | 395/600 |
| 5,144,679 | 9/1992 | Kakumoto et al. | 382/1 |
| 5,175,852 | 12/1992 | Johnson et al. | 395/600 |
| 5,201,048 | 4/1993 | Coulter et al. | 395/600 |
| 5,202,982 | 4/1993 | Gramlich et al. | 395/600 |
| 5,226,117 | 7/1993 | Miklos | 395/157 |
| 5,301,286 | 4/1994 | Rajani | 395/400 |
| 5,345,551 | 9/1994 | Shelley et al. | 395/157 |
| 5,359,697 | 10/1994 | Smith et al. | 395/3 |
| 5,412,808 | 5/1995 | Bauer | 395/600 |
| 5,422,815 | 6/1995 | Hijikata | 364/449 |
| 5,438,661 | 8/1995 | Ogawa | 395/157 |
| 5,440,708 | 8/1995 | Takagi | 395/418 |

*Primary Examiner*—Thomas G. Black
*Assistant Examiner*—Jean R. Homere
*Attorney, Agent, or Firm*—Whitham, Curtis, Whitham & McGinn; Richard Lau

[57] ABSTRACT

A program allows a user to know instantly which data files have not been updated, which data files or menu items may have been incorrectly named and which data files have no corresponding references on the menus. The program matches a series of menus for an application program to the actual files on a disk to see if there are menu items with no data files and to see if there are data files with no corresponding menu items. The output is a list of menus with missing data files and a list of data files with missing menu items. The program will accept as arguments the first "N" number of characters of a list of menu items and the disk where the data files reside. The system identifies all menus that have the identified "N" characters and will read all of the data files on the indicated disk and match the menus data files with the data files on the disk.

6 Claims, 7 Drawing Sheets

5,537,587

FILE RECORD MAINTENANCE IN A DATA PROCESSING SYSTEM BY SYNCHRONIZATION OF MENUS WITH CORRESPONDING DATA FILES

DESCRIPTION

BACKGROUND OF THE INVENTION

1. Field of the Invention

The present invention generally relates to file record maintenance in electronic data processing systems and, more particularly, to a system for determining which menu items have or do not have data supporting them and which files on a disk have no corresponding references on a series of menus for an application program.

2. Description of the Prior Art

Application programs that depend on a number of independent users to update both their individual menus and the corresponding data files share a problem. The problem is that people responsible for the entire application must know if all of the data items have been updated. The problem is exacerbated when the application programs are part of a system or suite of application programs which share a common menuing system and share data files.

There may be thousands of line items contained in the hundreds of applications within some of the more complex application systems now in use. As these systems grow and change with enhancements, updates, deletions, etc., it becomes a very tedious task to monitor the menu items to see if there is data behind the item or not or if data files contained on the system have a corresponding menu line item to make it viewable to the end user. Data without a menu item is hidden and cannot be viewed. It occupies space and has no way of being identified for removal from the system. To check the menus on an individual basis would be a prohibitive task from a resource perspective and would be ineffective at best.

Determining which menu items have or do not have data supporting them and which files on a disk have no corresponding references on a series of menus for an application is not possible without checking each file.

SUMMARY OF THE INVENTION

It is therefore an object of the present invention to provide a program that allows a user to know instantly which data files have not been updated, which data files or menu items may have been incorrectly named and which data files have no corresponding references on the menus.

It is another object of the invention to provide a system that determines which menu items have or do not have data supporting them and which files on a disk have no corresponding references on a series of menus for an application program.

According to the invention, there is provided a program which matches a series of menus for an application program to the actual files on a disk to see if there are menu items with no data files and to see if there are data files with no corresponding menu items. The output is a list of menus with missing data files and a list of data files with missing menu items. The program will accept as arguments the first "N" number of characters of a list of menu items and the disk where the data files reside. The system identifies all menus that have the identified "N" characters and will read all of the data files on the indicated disk and match the menus data files with the data files on the disk.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED

EMBODIMENT OF THE INVENTION

In the process according to a preferred embodiment of the invention, a series of tables are implemented and employed to determine file mismatch and menu mismatch records. These tables are defined below.

- TABLE AA Contains the file name (fn) and file type (ft) of the menus found on the disk. Index is sequential.
- TABLE BB Contains the file name (fn) and file type (ft) of all the files on the disk that are not menus. Index is sequential.
- TABLE CC Contains all of the items from all of the menus. The menu name is overlaid at the beginning of each record. Index is sequential.
- TABLE DD Contains the record number of the item from table CC. Index is the menu file name.
- TABLE EE Contains the file name (fn) and file type (ft) of the data file mismatches and the menu file name. Index is sequential.
- TABLE FF Contains each line from a menu. It is a dynamic table that is loaded with each menu's lines as required. Index is sequential.
- TABLE GG Contains the data file name from the menu and the menu name and file type. Index is sequential.
- TABLE HH Contains a "1" for all of the files on the disk that are not menus. Index is file name (fn) of the data file.
- TABLE JJ Contains the menu names and the file name (fn) and file type (ft) of the data files pointed to on the menus. Index is sequential.

Figure 1:
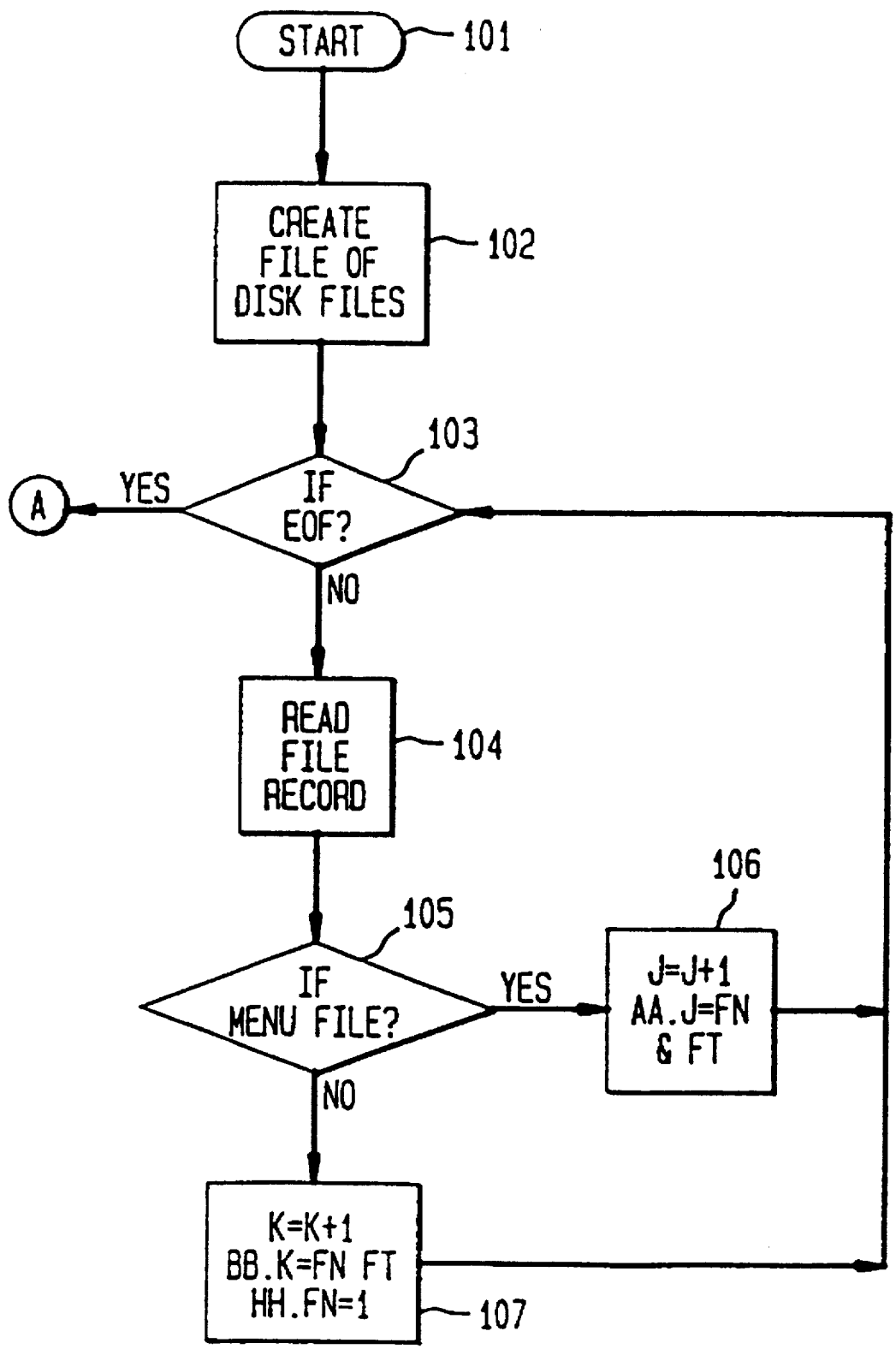
FIG. 1 is a flow diagram showing the logic for creating a table AA of menus, a table BB of data files and for building table HH, whose indices are the data file names.

Referring now to the drawings, and more particularly to FIG. 1, there is shown a flow diagram of the logic for creating tables AA and BB and building table HH. In operation 101, the program is started. In operation 102, a file is created of all of the files on a disk. Then, in operation 103, each file is read and tested to determine if there is an end of file. If not, the next file record is read in operation 104. In operation 105, a test is made to determine if the file name is a menu file. If so, the J counter is incremented, the table AA is loaded with the menu file name (fn) and file type (ft) in operation 106; otherwise, the K counter is incremented, the table BB is loaded with the data file name and file type in operation 107. The counters J and K respectively contain counts of the numbers of files which are menus and of files which are not menus. In addition, the table HH is loaded with "1" and the index is made equal to the data file name in operation 107. Control after operations 106 or 107 is returned to operation 103 where again a file is read and tested to determine if there is an end of file. When an end of file is detected, the process goes to the flow diagram shown in FIG. 2, to which reference is now made.

From operation 103 in FIG. 1, a test is first made in operation 201 to determine if the end of table AA has been reached. If not, the next table AA record is read in operation 202. Then, in operation 203, the FF table is set to nulls, and the menu name is parsed from the AA table record. The entire menu is read into the FF table in operation 204. A test is then made in operation 206 to determine if the end of table FF has been reached. If not, the next table FF record is read in operation 207. In operation 208, the J1 counter is incremented, the CC table is loaded with a line from the menu being read, and at the same time the menu name is overlaid in positions 1–8 of the CC table. The counter J1 contains a count of the items from the menu that is being processed. Control is then passed back to operation 206 where, again, a test is made for the end of table FF. When the end of table FF is detected, control is passed to operation 201, and when the end of table AA is detected, control is passed to the flow diagram shown in FIG. 3.

Figure 2:
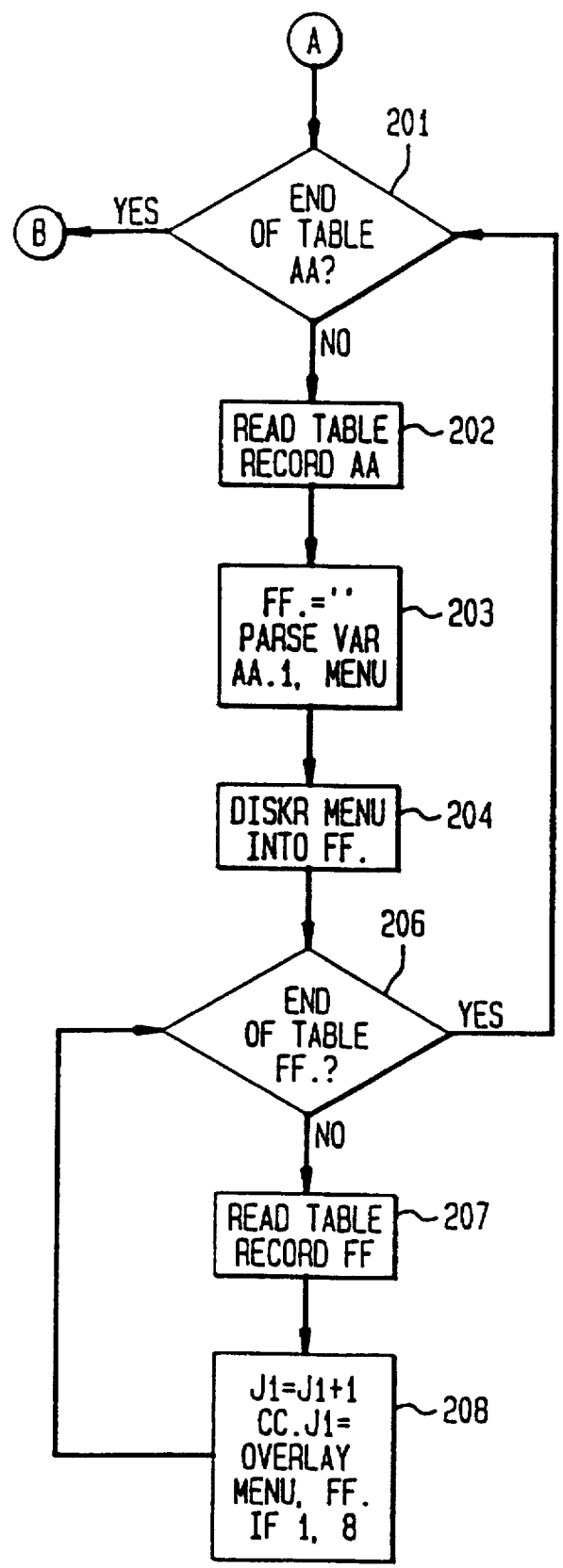
FIG. 2 is a flow diagram showing the logic for creating a table FF, which contains all of the menu data items.

Thus, the table CC is generated by the logic illustrated by the flow diagram of FIG. 2. The loop that reads the list of menus has a subloop 206 to 208 that reads every item from the menu that is being processed from the major loop 201 to 204. The purpose of table CC is to have a table of all the menu items with a menu name for each menu item. Note that the table CC will contain all of the lines of the menus. The menu name is in positions 1 to 8 of the table.

Figure 3:
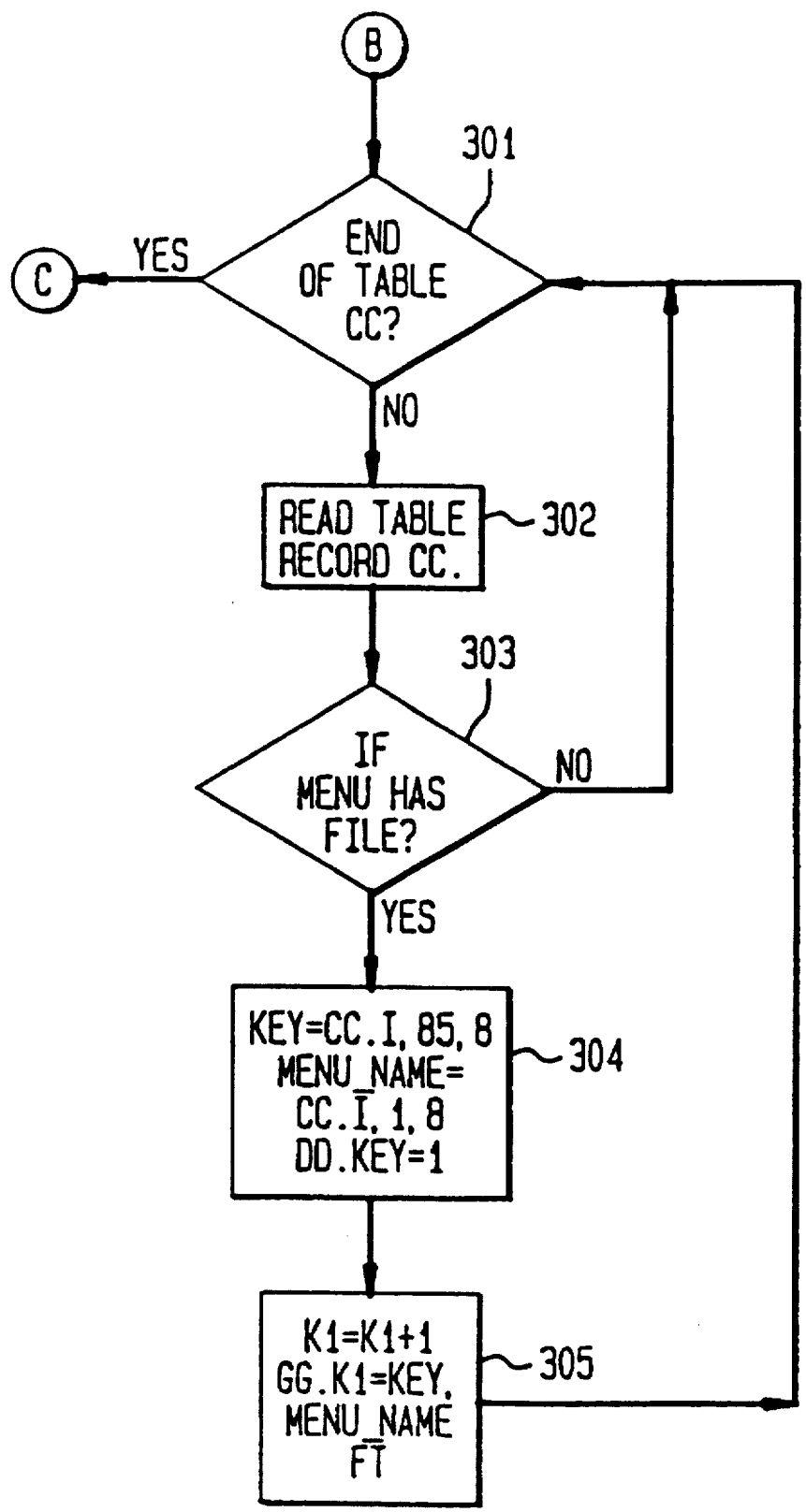
FIG. 3 is a flow diagram showing the logic for creating a table DD, whose indices are the menu data file data names, and for loading a table GG with menu data file name, menu name and the menu data file type.
Figure 4:
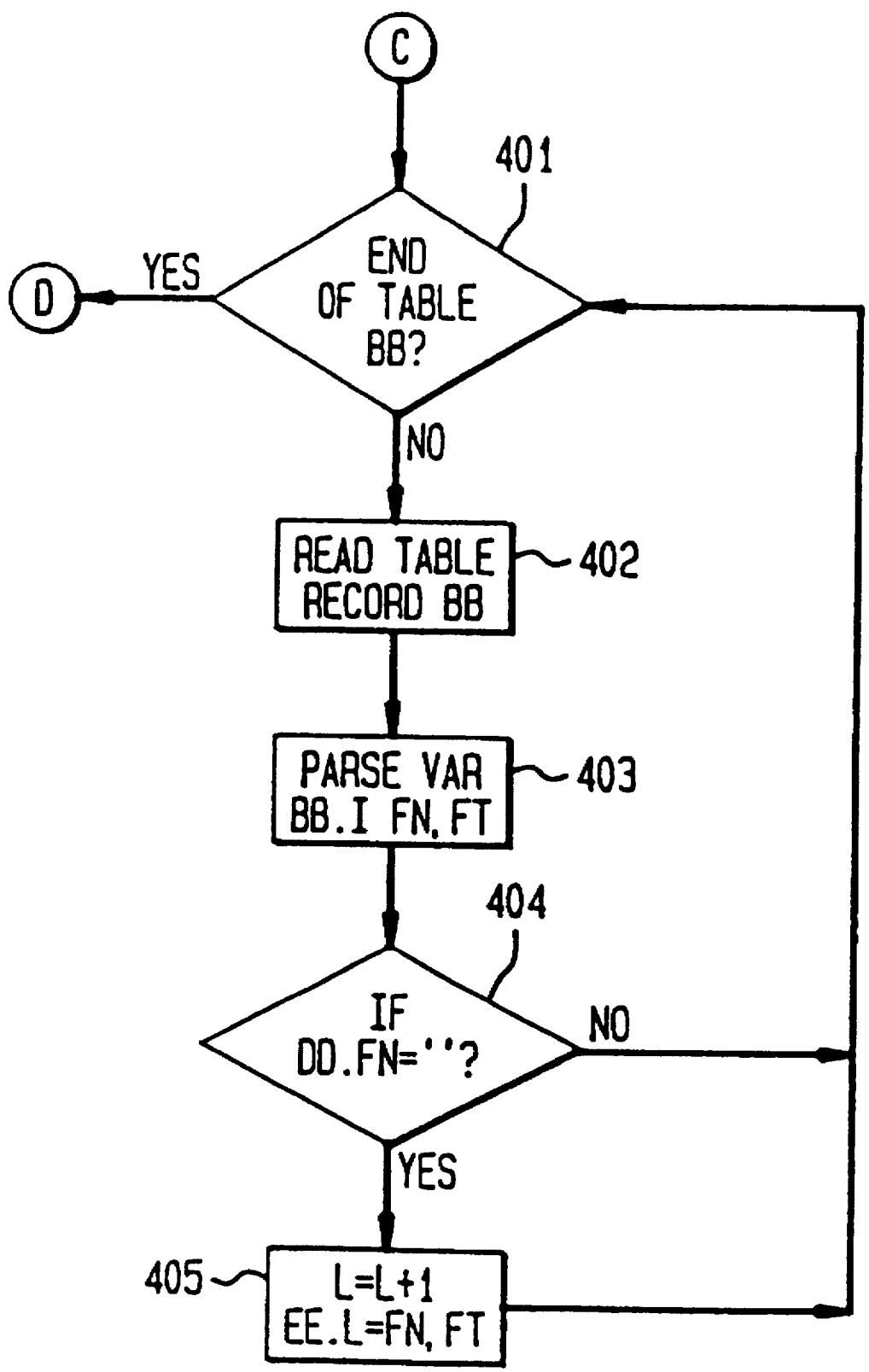
FIG. 4 is a flow diagram showing the logic for finding data files with no corresponding menu data file names.

Referring now to FIG. 3, first a test is made in operation 301 to determine if the end of table CC has been reached. If not, the next table CC record is read in operation 302. A test is made in operation 303 to determine if the menu item points to a file. If not, control passes back to operation 301, but if so, the key made equal to the data file name pointed to in the menu (CC.I,85,8), the menu name equals CC.I,1,8, the key of the DD table is made equal to the data file pointed to by the menu, and the DD.key element is loaded with "1" in operation 304. Then in operation 305, the K1 counter is incremented, and the GG table is loaded with the file name pointed to by the menu item in the CC table, and the menu name and menu file type. The K1 counter contains a count of menu items processed. Control is then passed to operation 301 where, again, a test is made to determine if the end of table CC has been reached. When the end of table CC is detected, control goes to the flow diagram shown in FIG. 4, to which reference is now made.

Figure 5:
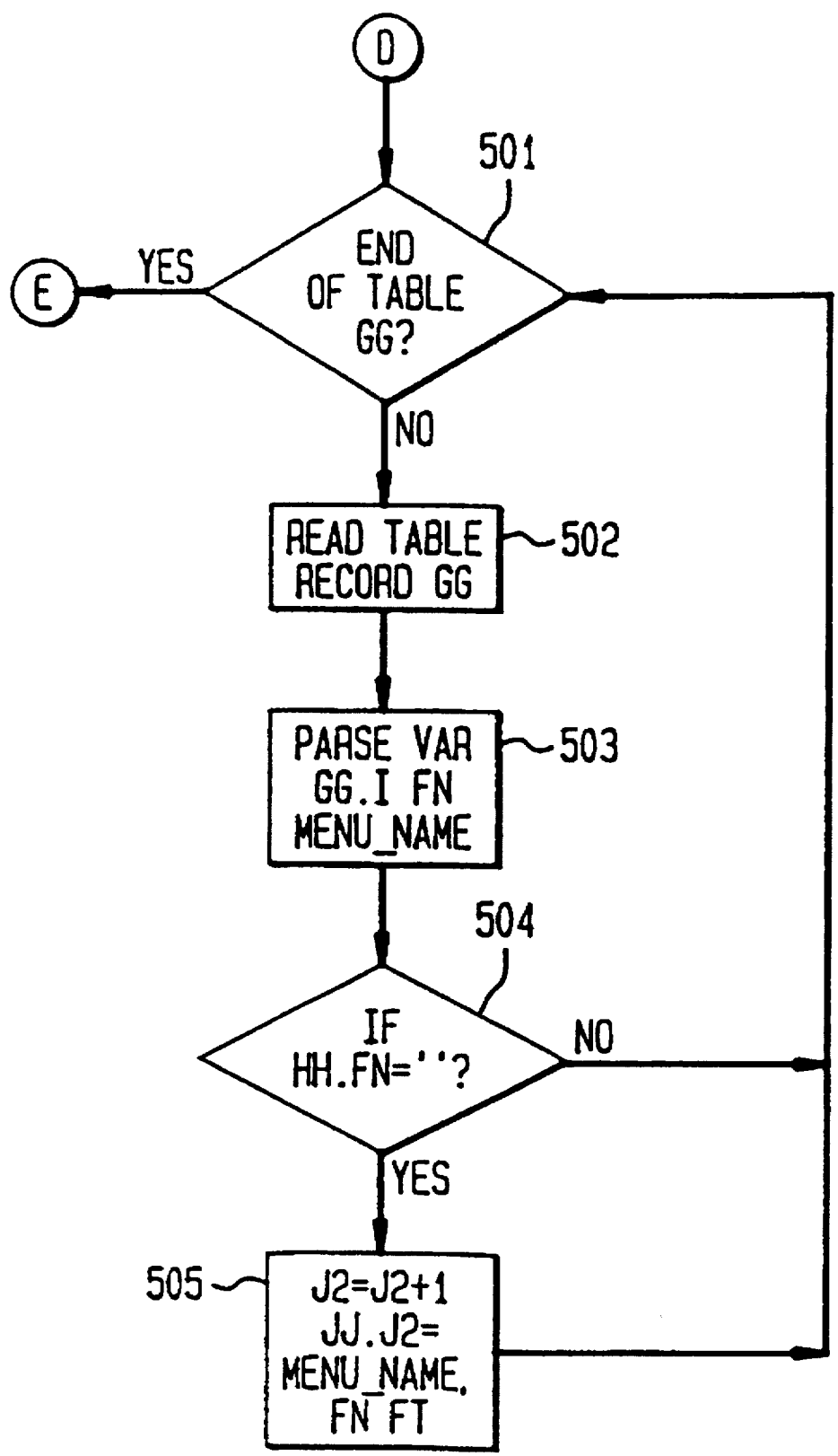
FIG. 5 is a flow diagram showing the logic for finding menu data file names with no corresponding data names.

In operation 401, a test is made to determine if the end of table BB has been reached. If not, the next table BB record is read in operation 402, and in operation 403, the file name and file type are read from the BB table (i.e., parse var BB.I fn ft). Then, in operation 404, a test is made to determine if the table DD with the key of the file name equals a blank (i.e., dd.fn="). If not, control passes back to operation 401, but if so, the L counter is incremented, the table EE is loaded with the data file name and data file type, and the key of the table EE is sequential in operation 405. Note that this is a file mismatch. Items are lists of data files not in the menus. At this point, control passes back to operation 401 where, again, a test is made for the end of table BB. When the end of table BB is detected, control passes to the flow diagram shown in FIG. 5, to which reference is next made.

In the first operation 501, a test is made to determine if the end of table GG has been reached. If not, the next table GG record is read in operation 502, and in operation 503, the data file name and menu file name in the menu are read (i.e., parse var gg.i fn menu_name). Then, in operation 504, a test is made to determine if the table HH with the key of the fn (i.e., file name) equals a blank (i.e., HH.fn="). If not, control passes back to operation 501, but if so, the J2 counter is incremented, the table JJ is loaded with the menu file name and the data file name and data file type of the pointer file from the menu, and the key of the table JJ is sequential in operation 505. The J2 counter contains a count of menu names processed. The table JJ holds the menu mismatches. At this point, control passes back to operation 501 where, again, a test is made for the end of table GG. When the end of table GG is detected, control passes to the flow diagram shown in FIG. 6, to which reference is next made.

In the first operation 601, a test is made to determine if there are data file mismatch records. If so, the data file mismatch records are written to a file in operation 602. When this is completed or if there were no data file mismatch records, a further test is made in operation 603 to determine if there a menu mismatch records. If so, the menu mismatch records are written to a file in operation 604. When this is completed or if there were no menu mismatch records, the process ends at operation 605.

Figure 7:
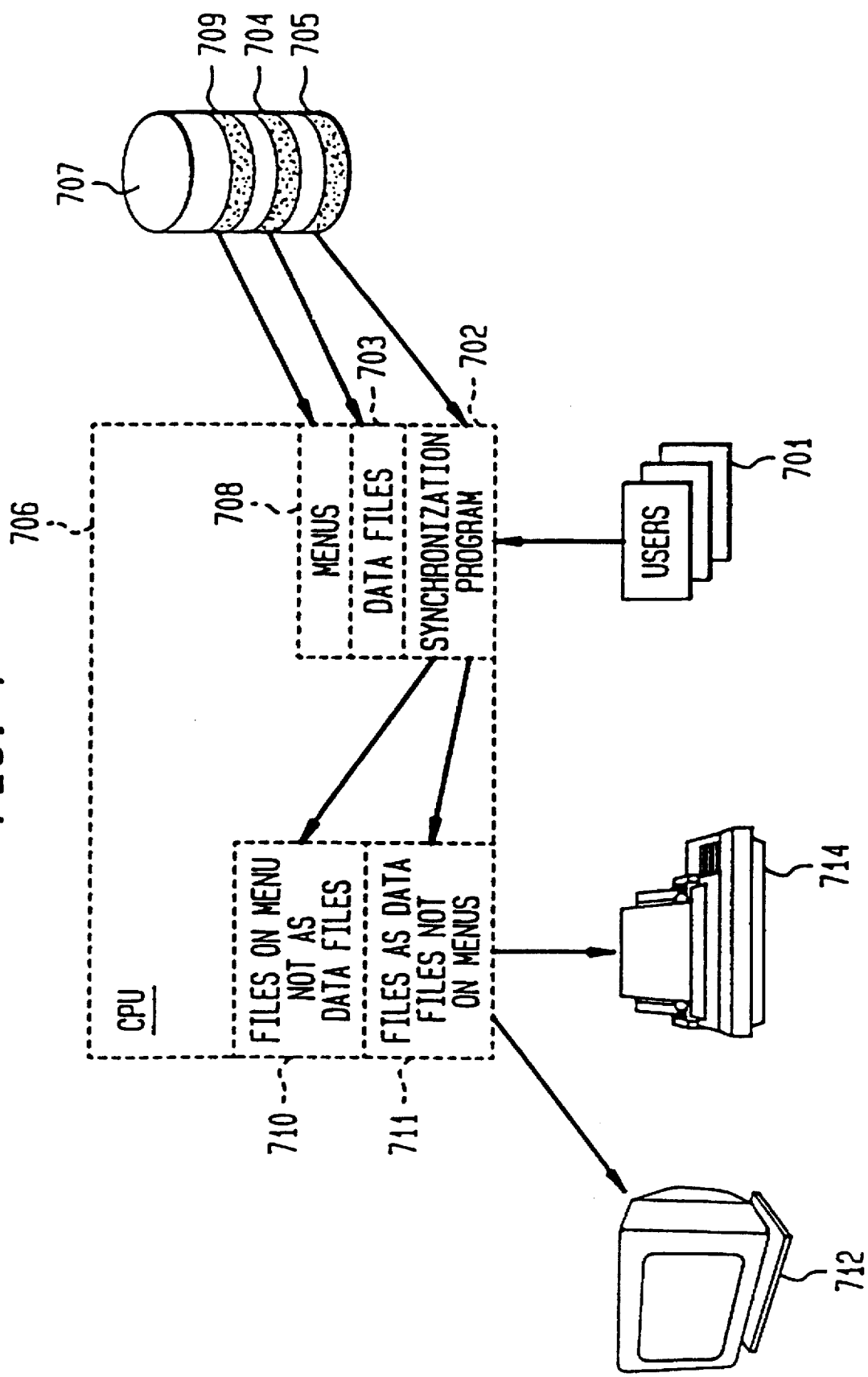
FIG. 7 is a system block diagram showing interaction between software and hardware according to a preferred embodiment of the invention.

The interaction of the software just described with the hardware of a data processing system is illustrated in FIG. 7, to which reference is now made. A plurality of users, collectively designated by the reference numeral 701, access a central processing unit (CPU) 706 of a server, mainframe computer, workstation or personal computer. The CPU 706 includes memory in which is stored the synchronization program 702 of the invention. This program is read from a direct access storage device (DASD) 707, such as a disk drive. The synchronization program 702 is stored in the segment 705 of the DASD 707 that contains the program. Also stored in memory of the CPU 706 are the data files 703 which are read from segment 704 of the DASD 707 that contains the data files. Likewise, the menu files 708 in memory are read from segment 709 of DASD 707 that contain the menu files.

Figure 6:
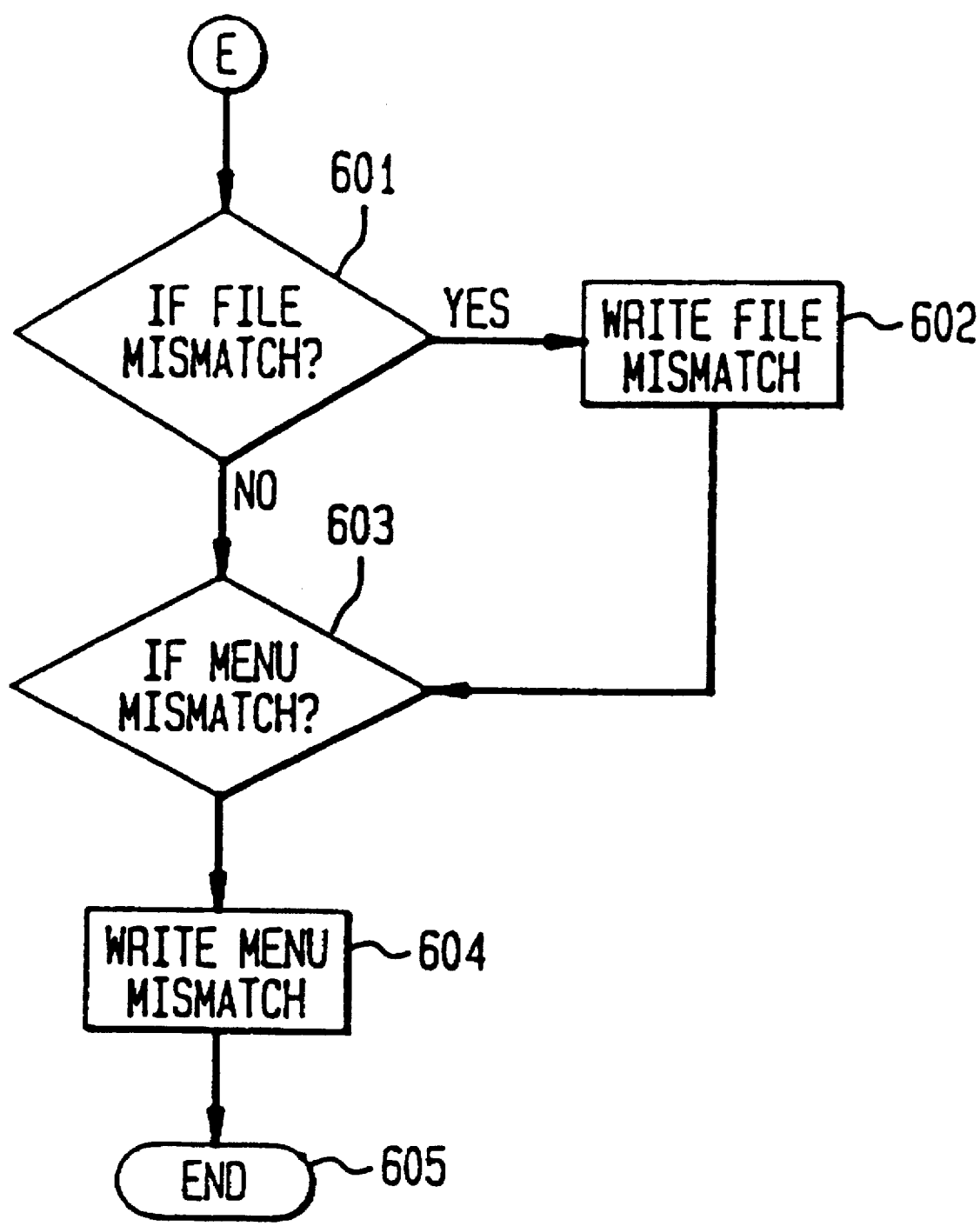
FIG. 6 is a flow diagram showing the logic for writing the list of menu data file names with no corresponding data file names and for writing the list of data file names with no menu data file names.

The synchronization program according to the invention finds data files with no corresponding menu data file names and finds menu file names with no corresponding data file names, as described with reference to FIGS. 1 to 5, supra. When this processing is complete, the logic of FIG. 6 is invoked to write the list of menu file names with no corresponding data files names to memory location 710 and to write the list of data file names with no menu data file names to memory location 711. These lists may then be either displayed on display device 712, such as a cathode ray tube (CRT) type display, or printed by a printer 714, or both, to provide an output to users 701. Thus, a user is instantly provided with information on data files which have not been updated, which files or menu items may have been incorrectly named and which data files have no corresponding references on the menus.

The synchroninzation program according to the invention accepts the first "N" characters of a set of menu names, allowing a search to be made on the "N" characters that are common to the set of menus. For example, if the set of "N" characters of "cOO", all menu names beginning with "cOO" are included in the list of menu names. This makes it possible for the program to use a set of menus that range from one menu to all menus.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A data processing system comprising:

a storage device storing an application program having a plurality of data files and a plurality of menus;

a central processing unit which reads said data files and menus from said storage device into system memory;

a synchronizing program in said system memory which reads records in a file and generates a first table of menus and a second table of data files and a third table with index equal to the data file name and the third table is loaded with a "1", reads said first table and creates a fourth table containing all items from all menus with a menu name for each item, reads said fourth table with items from all means with the menu file name overlaid at the beginning of each record and, for each record read from said fourth table, determining if the record read has a file and for each record having a file, setting a key in a fifth table equal to the data file name and setting values of the fifth table elements equal to "1", loading a sixth table with the file name pointed to by the menu item, menu name and menu file type, reads said second table and determines if there are missing data files by testing the fifth table which has a key equal to the file name reads said sixth table and determines if there are missing data files with no corresponding menu items by testing the third table which has a key equal to the file name; and means for storing a list of menus with missing data files and a list of data files with missing menus, each of said lists being generated by said central processing unit under the control of said synchronizing program.

2. The data processing system recited in claim 1 further comprising output means connected to said means for storing for outputting said list of menus with missing data files and said list of data files with missing menus to a user, thereby providing the user with information on data files which have not been updated, which files or menu items may have been incorrectly named and which data files have no corresponding references on the menus.

3. The data processing system recited in claim 2 wherein said output means comprises a display device.

4. The data processing system recited in claim 2 wherein said output means comprises a printer.

5. A method for determining which menu items have or do not have supporting data and which files on a disk have no corresponding references on a series of menus for an application program comprising the steps of:

reading said disk and creating a file of records corresponding to files on the disk;

reading the records in the file and, for each record read, determining whether the record is a menu file;

for each record read from the file which is a menu file, generating a first table containing the file name and tile type of the menus found on the disk;

for each record read from the file which is not a menu file, generating a second table containing the file name and file type of all files on disk that are not menus;

generating a third table with index equal to the data file name and loading the third table with a "1";

reading said first table and creating a fourth table containing all the items from all the menus with a menu name for each item;

reading said fourth table with items from all menus with the menu file name overlaid at the beginning of each record and, for each record read from said fourth table, determining if the record read has a file and, for each record having a file, setting a key in a fifth table equal to the data file name and setting values of the fifth table elements to "1";

loading a sixth table with the menu file name, menu name and menu file type;

reading said second table and determining for each record read from a second table whether there missing data files by testing the fifth table which has a key equal to the file name;

reading said sixth table and determining whether there are missing data file names with no corresponding menu items by testing the third table which has a key equal to the file name; and writing a list of menu file names with no corresponding data file names and writing a list of data file names with no menu file names.

6. The method for determining which menu items have or do not have supporting data and which files on a disk have no corresponding references on a series of menus for an application program recited in claim 5 further comprising the steps of:

accepting the first "N" characters of a set of menu names; and limiting a search of menu items to the "N" characters that are common to the set of menus, thereby using a set of menus that range from one menu to all menus for a search.

* * * * *